Patented Oct. 4, 1949

2,483,469

UNITED STATES PATENT OFFICE 2,483,469

BASIC LEAD PHOSPHITE PIGMENTS

Leonard M. Kebrich, Brooklyn, N. Y., assignor to National Lead Company, New York, N. Y., a corporation of New Jersey No Drawing. Application February 14, 1947, Serial No. 728,721

4 Claims. (Cl. 106—297)

This invention relates to basic lead phosphite compositions useful as pigments and more particularly to the preparation and use of dibasic lead phosphite and combinations of this compound with monobasic lead phosphite.

Monobasic lead phosphite is known and has been previously prepared by prolonged digestion of normal lead phosphite with ammonium hydroxide and by reacting a solution of basic lead acetate with ammonium phosphite. The products thus obtained by the prior art methods have been identified as monobasic phosphites and were found to contain a maximum of 85.9% lead oxide PbO, corresponding approximately to the formula for monobasic lead phosphite hemi-hydrate, $PbO.PbHPO_3.1/2H_2O$. Other basic lead phosphite compounds have not been described previously, so far as is known.

A principal object of this invention is to provide a white basic lead phosphite composition useful for pigment purposes containing more than 85.9% PbO. Another object of this invention is to provide a new chemical compound, dibasic lead phosphite, corresponding to the formula $2PbO.PbHPO_3.1/2H_2O$. Another object of this invention is to provide basic lead phosphite pigments characterized by high tinting strength and opacity. A further object is to provide surface coating compositions containing basic lead phosphite having excellent opacity and covering power and further characterized by excellent resistance to weathering. A still further object of this invention is to provide white rust inhibiting surface coating compositions especially valuable for protection of metal surfaces against corrosion. These and other objects will be apparent from the following description of the invention.

This invention in its broadest aspects contemplates the preparation of a new chemical compound, dibasic lead phosphite, and also coalesced mixtures of this compound with monobasic lead phosphite, in finely divided form, adapted for use as a pigment. The primary product of this invention, dibasic lead phosphite, represented by the formula $2PbO.PbHPO_3.1/2H_2O$, is in the form of fine acicular crystals, is of good white color, and possesses high tinting strength and covering power.

A general method for preparing dibasic lead phosphite is first to prepare a finely powdered suspension of lead monoxide or litharge in warm water containing a small quantity of lead acetate and then while agitating, slowly adding dilute phosphorous acid, using amounts sufficient to produce the dibasic salt. It will be noted that the process of this invention differs from the processes of the prior art in that lead oxide and phosphorous acid are the principal reactants and that the reaction is conducted in an aqueous medium in the presence of a small amount of a solution catalyst, namely lead acetate, to facilitate the reaction.

When the dilute phosphorous acid is added to the aqueous suspension which has a pH value of approximately 9.3, no change in the pH value occurs until, on the addition of sufficient phosphorous acid the suspension turns white. At this point a lowering of the pH value to 6.9 takes place and the white solid phase is found to contain on analysis 90.17% PbO, 4.18% P and 2.43% $H_2O$, corresponding to the compound dibasic lead phosphite, $2PbO.PbHPO_3.1/2H_2O$. This compound is constituted of well defined acicular crystals which are anisotropic in character. Due to the difficulties of obtaining proper optical orientation, the several indices of refraction were not easily determined, but one of the refractive indices was found to be about 2.25. The tinting strength of this pigment was found to be unusually high, approaching a value of 300 in comparison to 100 for Dutch process white lead, when tested by the method described in "Examination of Paints, Varnishes, Lacquers and Colors," by H. A. Gardner, 6th edition, p. 65.

On further treatment with phosphorous acid, the dibasic lead phosphite is converted to monobasic lead phosphite, $PbO.PbHPO_3.1/2H_2O$, during which conversion the pH value of the suspension remains constant at about 6.9. Thus, by maintaining the pH value of the suspension at about 6.9, it is possible, by using calculated amounts of materials, to produce mixtures of dibasic and monobasic lead phosphite. These pigments are insoluble in water and desirable from the standpoint of their pigment properties.

For the purpose of being more clearly understood, the preparation of dibasic lead phosphite and mixtures of the dibasic and monobasic lead phosphite will be illustrated by the following examples:

EXAMPLE I

Dibasic lead phosphite 1200 grams of finely powdered litharge were suspended in 6 liters of water containing 1.2 grams of glacial acetic acid. The suspension was heated to about 50° C. and vigorously agitated while 507.1 grams of a 29% phosphorous acid solution was slowly added over a period of 5¾ hours. The white solid obtained on filtration was found on analysis to contain 89.9% lead oxide, 7.30% phosphorous trioxide and 2.8% combined water corresponding to the formula $2PbO.PbHPO_3.1/2H_2O$.

EXAMPLE II

Equimolecular mixture of dibasic and monobasic lead phosphites 223.2 grams of powdered litharge were suspended in 1100 ml. of water containing 0.22 grams of glacial acetic acid. The suspension was heated to about 50° C. and while stirring, 113.1 grams of a 29% phosphorous acid solution was gradually added over a 5¾ hour period. The white product after being filtered and dried, was found to contain 88.4% lead oxide and 8.70% phosphorous trioxide and 2.9% combined water.

The methods described in the preceding examples are convenient for laboratory procedures. A method more adapted to commercial practice, however, is to mix the components in their proper proportions with water and to grind them together in a ball mill or other conventional grinding mill for several hours in which case a complete reaction is effected at normal room temperature. Such a procedure is illustrated by the following example:

EXAMPLE III

*Dibasic lead phosphite*

A mixture consisting of 1200 grams litharge, 507.1 grams of a 29% phosphorous acid solution, 1.2 grams of glacial acetic acid and 6 liters of water was placed in a 5 gallon porcelain lined ball mill with 14 lbs. of flint pebbles. The mill was sealed and rotated for several hours at room temperature. The reaction product, a suspension of fine acicular crystals, was transferred to a tray and dried at about 60° C. The dried product was found to be dibasic lead phosphite, comparable to the product of Example I.

Lead phosphite pigments prepared as outlined above may be made into surface coating compositions, such as paint, by ordinary well known methods. The physical and chemical properties, useful for compounding paint formulations, for both dibasic and monobasic lead phosphite are tabulated below. Compositions consisting of coalesced mixtures of the dibasic and monobasic salts will show properties dependent on the proportionate amount of each present in the composition.

|  | Dibasic Lead Phosphite | Monobasic Lead Phosphite |
|---|---|---|
| Formula | $2PbO.PbHPO_3.1/2H_2O$ | $PbO.PbHPO_3.1/2H_2O$ |
| Percent PbO | 90.2% | 85.9% |
| Specific gravity | 6.95 | 6.95 |
| Crystal Habit | acicular | acicular. |
| Color | white | white. |
| Tinting strength | 250-300 | about 220. |
| Oil absorption | 17 | 15. |
| Solubility in water | Insoluble | Insoluble. |

By way of illustration of the utility of dibasic lead phosphite in coating compositions, the following examples are cited.

EXAMPLE IV

The following paints were prepared in the usual manner.

| Paint No | 1 | 2 |
|---|---|---|
| Basic carbonate white lead..........pounds.. | 1,437.5 |  |
| Dibasic lead phosphite..........do.... |  | 1,483.7 |
| Alkali refined linseed oil..........do.... | 192.0 | 192.0 |
| Acid refined linseed oil..........do.... | 288.0 | 288.0 |
| Heat bodied linseed oil (Q)..........do.... | 32.5 | 32.5 |
| Liquid drier..........do.... | 15.5 | 15.5 |
| Mineral spirits..........do.... | 65.0 | 65.0 |
| Yield..........gallons.. | 103.73 | 103.73 |

These paints were applied to wooden panels of four different woods, white pine, yellow pine, cedar and cypress.

Three coats of each paint were applied with proper drying after each coat. The panels were exposed to natural weather conditions on vertical test fences with a southern exposure. After 33 months the relative ratings of the two paints, with 10 the optimum, were as follows:

| Paint No | 1 | 2 |
|---|---|---|
| Chalking | 8 | 9 |
| Checking | 7 | 10 |
| Scaling | 10 | 9 |
| Gloss | 1 | 3 |
| Cracking | 10 | 8 |

It is thus evident that outside white paints prepared from dibasic lead phosphite are approximately the equivalent, in respect to weathering, of those prepared from basic carbonate white lead which has long been recognized as the standard pigment for exterior paints.

That dibasic lead phosphite is also suitable as a rust inhibiting or anti-corrosion paint as illustrated by the following:

EXAMPLE V

The following paints were prepared in the usual manner.

| Paint No | 3 | 4 |
|---|---|---|
| Dibasic lead phosphite..........pounds.. | 34.1 |  |
| Red Lead (98% grade)..........do.... |  | 42.4 |
| Iron oxide..........do.... | 7.1 | 6.9 |
| Magnesium silicate..........do.... | 10.6 | 10.3 |
| Cumarone-Indene coal tar resin..........do.... | 25.6 | 24.9 |
| Coal tar naphtha..........do.... | 22.6 | 15.5 |

These paints were equivalent in composition on a volume basis when corrected for the volatile thinner content.

They were applied to hot-rolled steel panels, both sides, two coats being employed. A cover coat of a suitable anti-fouling paint was then applied. The panels were tested by immersion in marine waters. After 13 months immersion the two paints were examined. The results are noted below, where a rating of 10 indicates optimum resistance to the type of failure under question.

| Paint No. | 3 | 4 |
|---|---|---|
| General appearance—blistering | 7 | 6 |
| Peeling from metal base | 9 | 7 |
| General rusting | 10 | 7 |

The paint containing dibasic lead phosphite has shown superior resistance to the corrosive effects of sea water immersion, as shown by these tests.

The lead phosphite compositions of this invention may be used generally for applications where lead pigments are valuable. These will include use in surface coating compositions, printing inks of various kinds, pigmentation of rubber, plastics and other materials. Also the lead phosphite products of this invention will be found to be useful in applications where finely divided lead compounds are used because of certain chemical or physical properties, such, for instance, as high PbO content and high specific gravity. Such include use in ceramics, rubber compounding, heat stabilization of vinylite resins, and other applications which will become apparent from the chemical and physical properties shown.

The basic phosphite pigments of this invention have several advantages over previously known lead compounds used as pigments. The exceptionally high refractive index of basic lead phosphite results in definitely superior tinting strength, opacity, and hiding power. These characteristics are imparted to surface coating compositions such as paint, when the basic phosphite compositions are used as all or part of the pigment portion thereof. In addition to the advantage of high tinting strength, the basic phosphite pigments described impart unusual weather resistance to coating compositions; and it is particularly valuable that the weather resistance is good when such paints are used as rust inhibitive compositions, as well as for ordinary surface coatings. Generally speaking, special pigments have previously been used for rust inhibitive paints, and these in turn are not generally used for paints for other uses, such as for the protection of wood. The advantage of basic lead phosphite containing paints is that they are valuable for ordinary painting purposes as well as for special applications where their rust inhibitive action is especially desired. A particular advantage of the basic phosphite containing paint when used for anti-corrosion work is its white color. Red lead has previously been used largely for this type of paint; however, the red color of this pigment often is disadvantageous for certain applications, while, on the other hand, white basic lead phosphite pigment may be used to make substantially white coatings, or tinted to any desired color.

Another advantage of the basic lead phosphite pigments when used in anti-corrosion paints is their ready compatibility with certain synthetic resins which cannot generally be used with a lead pigment which contains even a small amount of free PbO, such as red lead. The formulation of these anti-corrosion paints has recently tended to include certain of these more desirable resins which cannot be used with red lead due to its basic reactivity, but which can be used with the new basic lead phosphite pigments without danger of undesirable reactions.

It will be understood by those skilled in the art that while specific examples have been cited to show methods by which the products may be prepared, other methods may be found to be equally suitable; also, since examples of paint formulations have been given to show how the new basic lead phosphite pigments may be used in surface coating compositions, it is not intended to limit the use of these products to these examples. It will be further apparent that many different embodiments of this invention are possible without departing from the spirit thereof, and it is to be understood that the examples cited were given merely for purposes of illustration.

I claim:

1. A new chemical compound, useful as a pigment, dibasic lead phosphite corresponding to the formula $2PbO.PbHPO_3.1/2H_2O$.

2. A basic lead phosphite composition, useful as a pigment consisting essentially of a mixture of monobasic and dibasic lead phosphite said mixture containing more than 85.9% and up to 90.2% combined lead oxide, PbO, and characterized by acicular crystal form, white color and a tinting strength above 220.

3. A surface coating composition comprising a pigment and a film forming and drying vehicle, said pigment consisting of a basic lead phosphite composition consisting essentially of a mixture of monobasic and dibasic lead phosphite said mixture containing more than 85.9% and up to 90.2% combined lead oxide PbO and characterized by acicular crystal form, white color and tinting strength above 220.

4. A surface coating composition comprising a pigment and a film forming and drying vehicle said pigment consisting essentially of dibasic lead phosphite corresponding to the formula $$2PbO.PbHPbO_3 1/2H_2O$$

LEONARD M. KEBRICH.

REFERENCES CITED

The following references are of record in the file of this patent:

"Comprehensive Treatise on Inorganic Chemistry," Mellor, vol. 8, page 917.